US006774956B2

(12) United States Patent
Ono et al.

(10) Patent No.: US 6,774,956 B2
(45) Date of Patent: Aug. 10, 2004

(54) LIQUID CRYSTAL DISPLAY DEVICE WITH HOLDING CAPACITANCE

(75) Inventors: Kikuo Ono, Mobara (JP); Ryutaro Oke, Mobara (JP); Takahiro Ochiai, Mobara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/331,880

(22) Filed: Dec. 31, 2002

(65) Prior Publication Data

US 2003/0133053 A1 Jul. 17, 2003

(30) Foreign Application Priority Data

Jan. 15, 2002 (JP) ........................................ 2002-006101

(51) Int. Cl.[7] ............................................ G02F 1/1343
(52) U.S. Cl. ............................ 349/39; 349/38; 349/141
(58) Field of Search ............................ 349/38, 39, 141

(56) References Cited

U.S. PATENT DOCUMENTS 5,831,707 A * 11/1998 Ota et al. .................... 349/141
6,208,399 B1 * 3/2001 Ohta et al. .................. 349/139
6,459,464 B1 * 10/2002 Nakasima et al. .......... 349/141

* cited by examiner

Primary Examiner—Robert H. Kim
Assistant Examiner—Andrew Schechter
(74) Attorney, Agent, or Firm—Antonelli, Terry, Stout & Kraus, LLP

(57) ABSTRACT

An active matrix type liquid crystal display device includes semiconductor layers made of thin film transistors which are formed over a first substrate, a first insulation film formed over the semiconductor layers, a second insulation film formed over the first insulation film, and common lines formed over the second insulation film. The second insulation film includes regions where the film is removed which are positioned where the semiconductor layers are formed. Holding capacitance is formed by a common potential supplied from the common lines in the film-removed regions together with the pixel potential formed by the semiconductor layers.

16 Claims, 11 Drawing Sheets

LIQUID CRYSTAL DISPLAY DEVICE WITH HOLDING CAPACITANCE

BACKGROUND OF THE INVENTION

The present invention relates to a liquid crystal display device; and, more particularly, the invention relates to an active matrix liquid crystal display device of the thin film transistor (hereinafter referred to as "TFT") type or the like, and a method of manufacture thereof.

A liquid crystal display device, in view of the fact that the device is thin, light-weight and exhibits low power consumption, has been popularly used as a display device for displaying image information and character information in information handling equipment, such as a personal computer, a portable information terminal, a portable telephone, a digital camera, or visual equipment, such as a camera-built-in type VTR deck. Recently, along with the spread of large-capacity media and the start of BS digital broadcasting with the advent of DVD and the rapid progress in the development of large-capacity magnetic drives, the fusion of the personal computer and video digital media is in development, resulting in an increased demand for an image display device having a high image quality which can cope with such an application. A liquid crystal display adopting an in-plane switching (IPS) mode, which applies a lateral electric field to liquid crystal sealed in a gap between upper and lower substrates, has been recognized as a display method which is capable of satisfying such a demand for a high image quality, and various improvements have been made which promise further enhancement of the image quality.

On the other hand, along with the spread of portable telephones and portable information terminals, there has been an increased demand for various types of liquid crystal devices, ranging from medium-sized or small-sized liquid crystal display devices, which exhibit extremely low power consumption, to large-sized displays, including wall hanging television sets.

In a liquid crystal display device adopting the IPS mode, as disclosed in Japanese Laid-open Patent Publication 36058/1995, a method which performs switching of the liquid crystal using a lateral electric field, which is generated between two layered metal electrodes sandwiching an insulation film, has been most popularly used. However, there is a problem with such a structure in that, compared to a display device adopting the usual TN method, it is difficult to increase the aperture ratio of pixels, so that the light utilization efficiency is low. Since it is necessary to increase the brightness of the backlight to compensate for this defect, in such an LCD module it is difficult to attain the low power consumption which is demanded in a notebook type personal computer or a portable terminal.

To solve such a problem, in Japanese Laid-open Patent Publication 230378/1997, a method has been proposed in which pixel electrodes and a common electrode are arranged on an organic resin via through holes formed in the organic resin.

Further, as active elements for performing switching, TFTs using polysilicon have been known, besides TFTs using amorphous silicon.

SUMMARY OF INVENTION

The IPS type liquid crystal display device has a low aperture ratio; and, hence, there has been a demand for a high aperture ratio, that is, a high transmissivity.

One advantage of the present invention lies in the fact that, in an IPS type liquid crystal display device using low-temperature polysilicon TFTs as pixel TFTs, by eliminating metal common electrode lines, which have been arranged conventionally in one pixel region in parallel with gate lines so as to enhance the aperture ratio (transmissivity), it is also possible to ensure a sufficient holding capacitance to prevent the lowering of the liquid crystal potential when light from the backlight is irradiated on the polysilicon. Further, another advantage of the present invention lies in the fact that short-circuiting between an electrode which forms the holding capacitance and a drain line can be prevented.

Other advantages of the present invention will become apparent from the following description in this specification. Some typical examples of the present invention are as follows.

(1)

In a liquid crystal display device having a liquid crystal layer and a color filter layer, which are sandwiched by a first substrate and a second substrate, having a plurality of gate lines, a plurality of drain lines which cross the plurality of gate lines in a matrix array, and thin film transistors which are formed corresponding to respective intersections of the gate lines and the drain lines on the first substrate, so that each pixel is formed in a region surrounded by neighboring gate lines and neighboring drain lines, the first substrate includes semiconductor layers constituting the thin film transistors, a first insulation film formed on the semiconductor layers, a second insulation film formed on the first insulation film, and common lines formed on the second insulation film, and the second insulation film includes removal regions, which are positioned in regions where the semiconductor layers are formed, and a holding capacitance is formed by a common potential supplied from the common lines in the removal region and a pixel potential formed by the semiconductor layer.

(2)

In a liquid crystal display device having a liquid crystal layer and a color filter layer, which are sandwiched by a first substrate and a second substrate, having a plurality of gate lines, a plurality of drain lines which cross the plurality of gate lines in a matrix array, and thin film transistors which are formed corresponding to respective intersections of the gate lines and the drain lines on the first substrate, so that each pixel is formed in a region surrounded by neighboring gate lines and neighboring drain lines, the liquid crystal display device includes common electrodes and pixel electrodes which are formed on the first substrate in the same layer, and the common electrodes and the pixel electrodes are arranged over the gate lines to face each other in a spaced-apart manner by way of an insulation film.

(3)

In a lateral electric field liquid crystal display device having a liquid crystal layer and a color filter layer, which are sandwiched by a first substrate and a second substrate, having a plurality of gate lines, a plurality of drain lines which cross the plurality of gate lines in a matrix array, and thin film transistors which are formed corresponding to respective intersections of the gate lines and the drain lines on the first substrate, so that each pixel is formed in a region surrounded by neighboring gate lines and neighboring drain lines, wherein each pixel includes a common electrode and a pixel electrode formed on the first substrate, a source electrode of each thin film transistor is, extended to the neighboring gate line without crossing over the common electrode or a common electrode line, this neighboring gate line being different from the gate line over which the thin film transistor is formed, and a holding capacitance is formed between one electrode which is the gate line of a preceding row and another electrode which is the source electrode.

Further examples of the present invention will be apparent from the embodiments of the present invention which will be explained hereinafter.

DETAILED DESCRIPTION

Typical structures which constitute features of the present invention will be explained hereinafter in conjunction with various embodiments.

Embodiment 1

Figure 1:
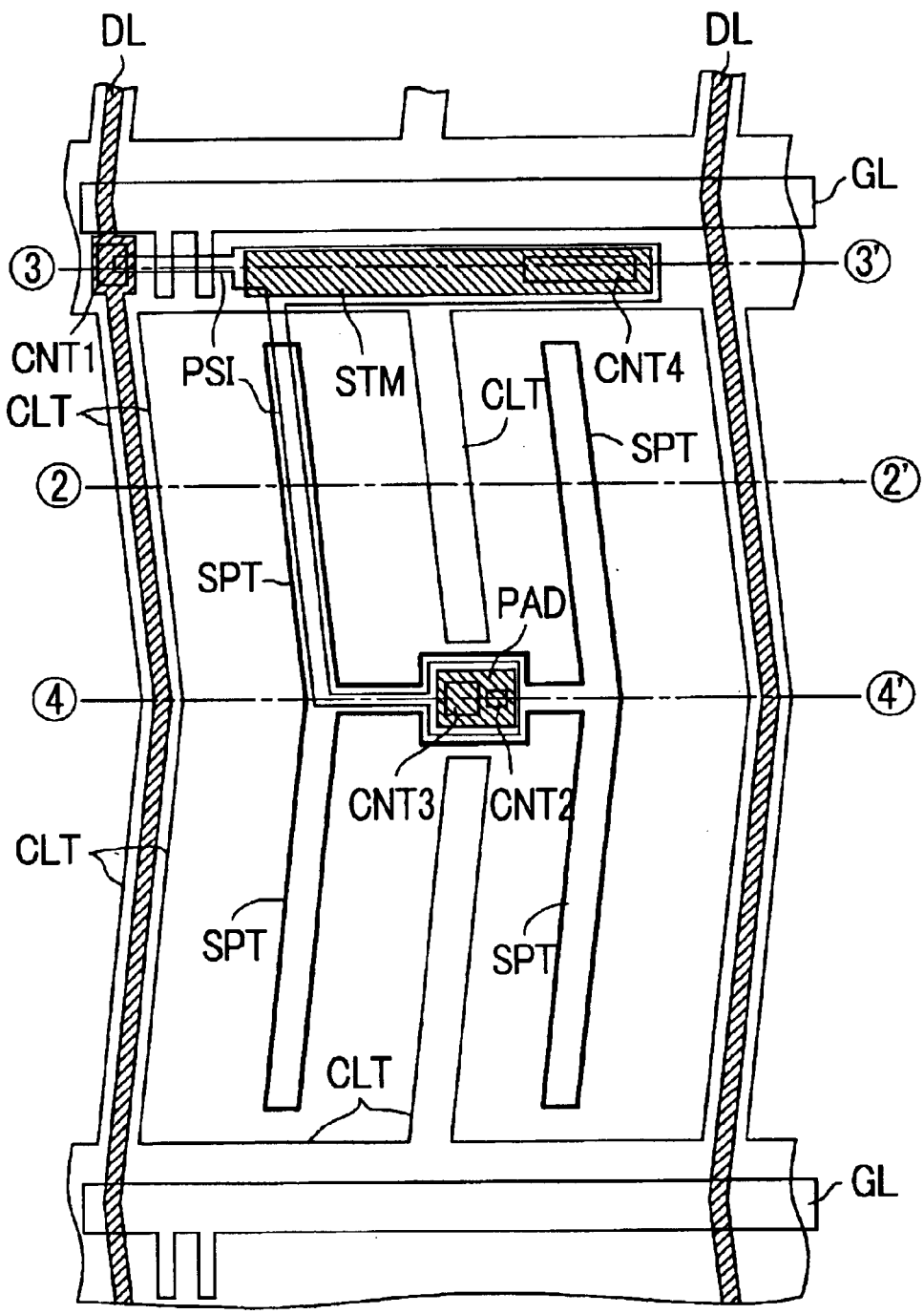
FIG. 1 is a plan view of an essential part of a pixel of a TFT liquid crystal display device according to one embodiment of the present invention.
Figure 2:
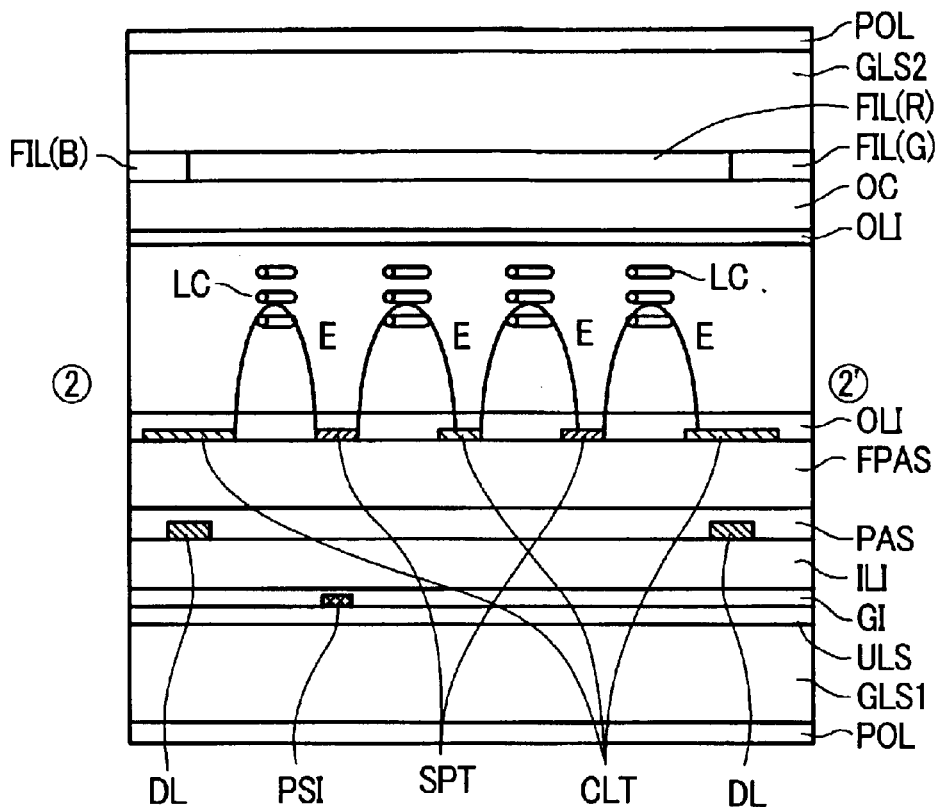
FIG. 2 is a cross-sectional view of an essential part of a pixel taken along a line 2–2' in FIG. 1.
Figure 3:
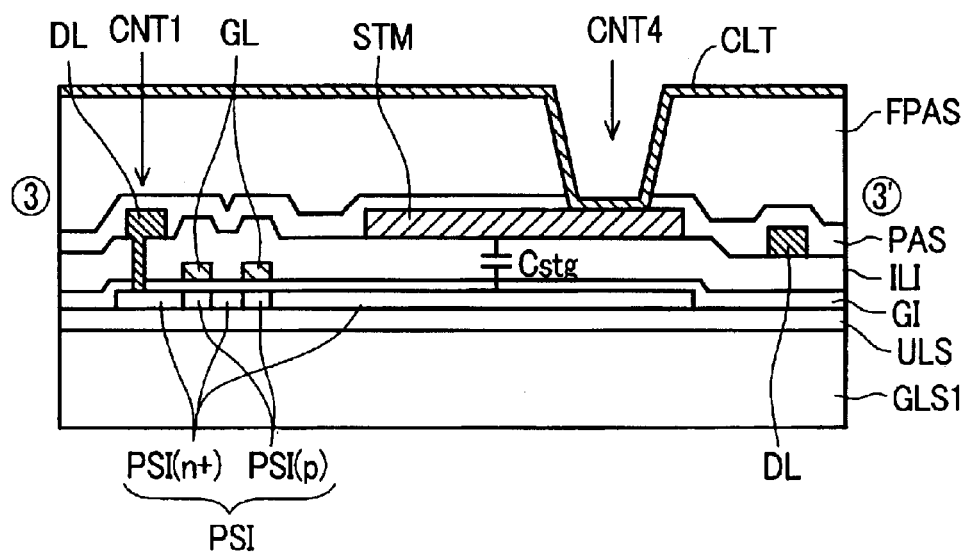
FIG. 3 is a cross-sectional view of an essential part of a pixel taken along a line 3–3' in FIG. 1.
Figure 4:
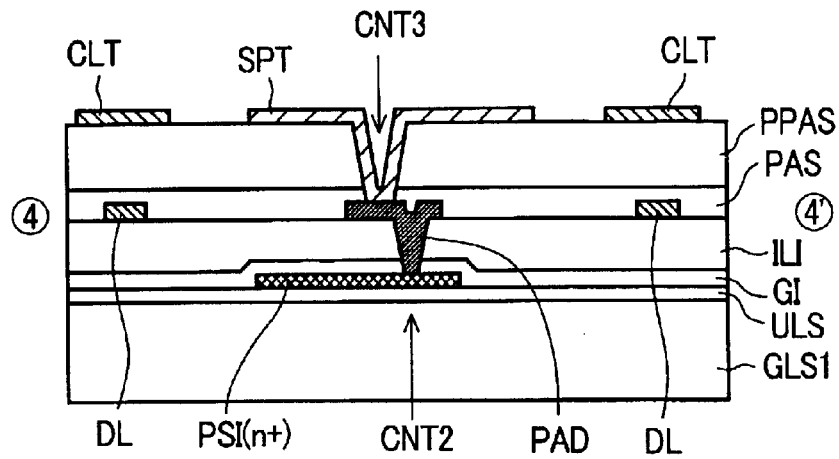
FIG. 4 is a cross-sectional view of an essential part of a pixel taken along a line 4–4' in FIG. 1.

FIG. 1 to FIG. 5 are a plan view and cross-sectional views of a pixel according to a liquid crystal display device representing one embodiment of the present invention. FIG. 2, FIG. 3 and FIG. 4 are cross-sectional views taken along cut lines indicated by chain lines 2–2', 3–3' and 4–4' in FIG. 1, respectively. In these drawings, to facilitate an understanding of the cut portions in the drawings, numerals surrounded by circles are used to indicate the cut portions. The drawings show essential parts for purpose of explanation, and orientation films are omitted from some drawings. Further, the counter-substrate-side constitution is also omitted from some drawings. Hereinafter, these drawings will be explained in sequence.

FIG. 1 shows a schematic planar pattern of one pixel. The pixel is configured such that it is surrounded by neighboring gate lines GL and neighboring drain lines DL. The gate line GL also functions as a gate electrode for a TFT in which a semiconductor layer is constituted of a polysilicon PSI, and it supplies a voltage which turns the TFT on or off. The drain line DL supplies an electric current to the polysilicon PSI. That is, a video voltage (drain voltage), which is applied when the gate line GL supplies an ON voltage, is supplied to the liquid crystal capacitance or the holding capacitance of one pixel; and, eventually, the potential of the low-temperature polysilicon, which is pulled out to a center portion of the pixel, as well as the potentials of a pad electrode PAD and a transparent pixel electrode SPT, which is connected to the pad electrode PAD, assume the video potential.

The flow of the electric current leads to the polysilicon PSI from the drain line DL through a first contact hole CNT1, and the electric current which flows in the polysilicon PSI flows into the pad electrode PAD through a second contact hole CNT2 that is arranged at the center portion of the pixel. Further, the electric current reaches a transparent pixel electrode SPT on the insulation film from the pad electrode PAD through a third contact hole CNT3. The transparent pixel electrode SPT is arranged in an H shape, as an example.

The common electrode potential of another electrode, which forms the liquid crystal capacitance or the holding capacitance with the pixel electrode, is applied through the following path. Transparent common electrode lines CLT are arranged over the gate line GL and the drain line DL by way of an insulation film having a low dielectric constant, such that the transparent common electrode lines CLT shield the gate line GL and the drain line DL. The transparent common electrode line CLT is branched to the inside of the pixel and serves as a common electrode which drives the liquid crystal together with the pixel electrode SPT. In this manner, the transparent common electrode line CLT is arranged in a mesh pattern to cover the gate lines GL and the drain lines DL and is connected by bonding with metal lines having a low resistance in a peripheral region of the screen. The low-resistance lines function as bus lines for the common potential.

In the IPS liquid crystal display device, the liquid crystal capacitance is a value defined by a lateral electric field generated between the transparent common electrode CLT and the transparent pixel electrode SPT shown in FIG. 1; and, hence, the value is not more than half of the corresponding value of a vertical electric field type liquid crystal display device, such as a TN type liquid crystal display device, which determines the liquid crystal capacitance between electrodes that are respectively arranged at upper and lower substrates that face each other. Accordingly, only in the in-plane switching (IPS) mode, for which the common electrodes and the pixel electrodes are formed on one substrate, even when transparent electrode material having a high resistance value, such as indium-tin-oxide (ITO), is used, the specification of the wiring resistance of the transparent common electrode line CLT can be met by minimizing the line delay, and so favorable image quality is obtained. It is needless to say that when the transparent common electrode line CLT is made of a transparent electrode material, indium-zinc-oxide (IZO) or indium-tin-zinc-oxide (ITZO) and the like can be used as the transparent common electrode line CLT.

The potential of the common electrode and the common electrode line is, for example, set to an intermediate value of the pixel potentials, which are alternated every frame (to be explained in detail later in conjunction with FIG. 14). The liquid crystal capacitance or the holding capacitance is formed by the pixel electrode potential and the common electrode potential; the electric field is generated inside the liquid crystal layer by the difference between potentials; and images are displayed by the video voltages supplied from the drain line DL and the common voltage. Main transmitting parts are constituted of four opening portions formed along a line 2–2' in FIG. 1.

In the liquid crystal display device, at any one time, most TFT's assume the OFF state, and they assume the ON state only during an extremely short period of time. For example, with respect to XGA, 768 gate lines GL are sequentially and selectively turned on one by one and the remaining 767 gate lines GL remain in the OFF state. Accordingly, with respect to one gate line GL, 767/768 of the time, a TFT is in the OFF state. Here, it is indispensable for the liquid crystal display device of high image quality to suppress the attenuation of the voltage of the liquid crystal capacitance in the OFF state. Accordingly, the formation of a holding capacity is indispensable in the conventional liquid crystal display device using TFTs. As a method of forming the holding capacity, a method which forms the holding capacity by providing dedicated lines for the potential of the common electrodes in the pixel and a method which forms the holding capacitance using gate lines GL of neighboring pixels are known. These holding capacitances also may be classified such that the former is referred to as Cstg and the latter is referred to as Cadd. However, in both cases, to ensure the stability of the holding capacitance, the dedicated lines are necessary in the former and the potential of the gate lines GL must be stable in the latter. Accordingly, the latter uses a metal of low resistance.

Further, while the signals must be changed in a complicated manner due to the supply of gate signals in the latter, the former can ensure a stable potential; and, hence, it has been known that the former is advantageous with respect to provision of excellent stability. However, the holding capacitance formed by the former, that is, the holding capacitance Cstg, has been conventionally formed by laminating the common electrode lines, using the same steps and the same material as the gate lines GL, and the pixel electrodes or the source electrodes to each other byway of an insulation film. Accordingly, it is necessary to arrange the common electrode lines so that they are spaced apart from the gate lines at a fixed distance to avoid short circuits. Since the common electrode lines are made of metal, this lowers the aperture ratio corresponding to the presence of the common electrode lines, so that the transmissivity is decreased.

To solve such a drawback, according to this embodiment, the holding capacitance is formed between the low-temperature polysilicon PSI and the holding capacitance electrode STM, which is constituted by the same steps and the same material as the drain line DL. That is, contact holes CNT4 are formed in an insulation film which covers the gate lines GL and the holding capacitance electrodes STM, so that the common potential is supplied from the transparent common electrode lines CLT to the holding capacitance electrodes STM. Then, by arranging the holding capacitance electrode STM having the common potential and the low-temperature polysilicon PSI having the pixel potential so that they face each other by way of the insulation film, as seen in the cross-sectional structure, the holding capacitance Cstg can be realized. Accordingly, it is possible to form the holding capacitance Cstg without using the metal common electrode lines, whereby the transmissivity and the aperture ratio are enhanced. Further, the holding capacitance electrodes STM and the low-temperature polysilicon PSI are separated from the gate lines GL by insulation films, as seen in the cross-sectional structure. Accordingly, it is possible to arrange the holding capacitance at positions close to the gate lines GL in the plane, and, hence, the transmissivity and the aperture ratio can be further enhanced.

A further skillful technique needed for this embodiment lies in the use of low-temperature polysilicon PSI. However, the low-temperature polysilicon in this specification means, for example, as shown in FIG. 3, a structure in which an n+ layer, that is formed by applying ion doping to the semiconductor layer, extends over the region where the gate line GL is formed. Accordingly, the temperature at the time of film forming is not limited, and the crystalline state is also not restricted. Accordingly, so-called high-temperature polysilicon, CGS, the continuous crystalline silicon and the like can be used.

With the use of low-temperature polysilicon, the low-temperature silicon which constitutes one electrode of the holding capacitance assumes the n+ state, that is, the highly conductive state due to ion doping. Accordingly, it is possible to treat the low-temperature silicon as equivalent to a metal; and, hence, a holding capacitance Cstg which requires no special dedicated wiring layer and uses no metal common electrode line can be realized. The potential inside of the pixel is in a stable state except for leaking when the TFT assumes the holding state, that is, the OFF state; and, hence, even when one electrode of the capacitance is formed of low-temperature polysilicon, it can sufficiently function as the electrode.

The transparent common electrodes CLT are integrally formed in a matrix array over the neighboring pixels arranged in the up and down direction as well as in the left and right direction. Accordingly, the potential of the common electrode is extremely stable and strongly resists fluctuation. In the above-mentioned in-plane switching mode, the liquid crystal capacitance between the common electrode and the pixel electrode is small; and, hence, the load applied to the transparent electrode is small. Accordingly, the potential of the common electrode becomes more stable. Thus, due to the contribution of these provisions in combination, it is possible to use a transparent common electrode CLT, which has a resistance higher than that of metal, as the line which supplies the common potential to the holding capacitance Cstg.

Hereinafter, the constitutions of respective parts will be explained in detail in conjunction with the cross-sectional views. FIG. 2 is a cross-sectional view taken along a line 2–2' in FIG. 1, and it shows a portion which traverses one pixel region between the neighboring drain lines DL. A substrate insulation film ULS, which is constituted of a $Si_3N_4$ film having a thickness of 50 nm and a $SiO_2$ film having a film thickness of 120 nm, is formed over an alkalifree TFT glass substrate GLS1, having a strain point of approximately 670 degrees centigrade. The substrate insulation film ULS serves to prevent the diffusion of impurities, such as Na or the like, from the TFT glass substrate GLS1. A gate insulation film GI, which is formed of $SiO_2$, is formed over the substrate insulation film ULS. The low temperature polysilicon PSI, which supplies the pixel potential, is formed over the gate insulation film GI.

An interlayer insulation film ILI made of $SiO_2$ is formed such that the film ILI covers all of the above-mentioned parts or members. The drain line DL formed of a three-layered metal film, such as Ti/Al/Ti, is formed over the interlayer insulation film ILI.

Onto the drain line DL, a protective insulation film PAS, which is made of $Si_3N_4$ having a film thickness of 200 nm, and an organic protective film FPAS, containing acrylic resin as a main component and having a film thickness of 2 µm, are applied. On the organic protective film FPAS, first of all, the transparent common electrode line CLT, made of indium tin oxide (ITO) and having a width wider than that of the drain line DL, is formed. The transparent pixel electrode SPT made of ITO, which is formed by the same step and of the same material which are used for forming the transparent common electrode line CLT, is also formed over the organic insulation film FPAS.

In the above description, the materials specified for forming the respective lines are not particularly limited.

The main transparent regions are four regions consisting of (1) a region formed between the transparent common electrode CLT over the drain line DL and the transparent pixel electrode SPT, which is arranged to cover the low-temperature polysilicon PSI in the plan view shown in FIG. 1, (2) a region formed between the above-mentioned transparent pixel electrode SPT and the transparent common electrode line CLT extending upwardly and downwardly from the gate line GL, (3) a region formed between the above-mentioned transparent common electrode CLT and the transparent pixel electrode SPT, and (4) a region arranged between the transparent pixel electrode SPT and the transparent common electrode line CLT arranged over the drain line DL. The above-mentioned transparent pixel electrodes SPT and the transparent common electrodes CLT constitute electrodes which drive the liquid crystal.

On the other hand, color filter (CF) substrate GLS2 faces the TFT glass substrate GLS1 and seals in liquid crystal LC together with the TFT glass substrate GLS1. Color filters (FIL), which are constituted of organic film material dispersing pigments for performing color display at a liquid crystal side thereof, are formed over the CF glass substrate GLS2. These color filters FIL produce the transmitting lights of blue (B), red (R), green (G) corresponding to colors allocated to respective pixels. For example, the color filter which produces the transmitting light of the color red (R) is indicated by FIL (R). On inner sides of these color filters FIL, an overcoat film OC made of organic material is formed. Although the overcoat film OC may be eliminated, this film is desirable in order to enhance the flatness. Orientation films OLI are printed on respective surfaces of the CF glass substrate GLS2 and the TFT glass substrate GLS1, which are brought into contact with the liquid crystal LC, and a given rubbing is applied to these orientation films OLI so as to control the initial orientation direction of the liquid crystal LC. Further, to respective outer surfaces of the CF glass substrate CLS2 and the TFT glass substrate CLS1, polarizers POL are respectively laminated. These polarizers POL are formed under a so-called crossed Nicols arrangement in which polarization axes cross each other between the glass substrates.

Figure 16:
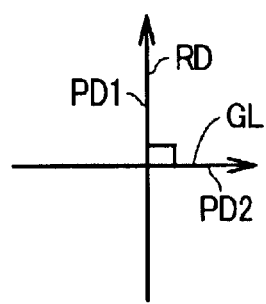
FIG. 16 is a diagram showing the relationship between the polarizer and the initial orientation direction according to the one embodiment of the present invention.

The relationship of the angle between the rubbing direction and the polarization axes is shown in FIG. 16. One polarization axis PD2 is arranged in the same direction as the gate line GL and the other polarization axis PD1 is arranged in the direction perpendicular to the gate line GL. Further, the rubbing directions RD of both upper and lower substrates GLS1, GLS2 are arranged in the direction perpendicular to the gate line GL. Due to such a relationship, an arrangement producing a normally black mode is obtained. Further, although a multi-domain is designed by adopting the bent-shape pixel pattern shown in FIG. 1, it is needless to say that a non-multi-domain is also included in the scope of the present invention. It is also necessary to arrange the polarizers in a crossed Nicols arrangement in such a case.

In the cross section of the CF substrate GLS2, a so-called black matrix BM is not formed. The connection of colors of the color filters FIL are performed on the transparent common electrode line CLT which is arranged to cover the drain lines DL.

The width of the transparent common electrode line CLT, which covers the drain line DL, is required to be at least two times larger than the width of the drain line DL. This is because, in the IPS liquid crystal display device, basically, when an electric field other than the electric field generated by the common electrode potential and the pixel potential is applied to the liquid crystal, an incorrect operation occurs; and, hence, a shielding having a sufficient width is necessary. On the other hand, there is no such restriction with respect to the width of the common electrode line CLT in other portions.

However, in the IPS liquid crystal display device using a positive-type liquid crystal material, light does not pass through the transparent electrode. This is because a lateral electric field is not generated in the electrode having a large width, and, hence, the liquid crystal molecules are not rotated. A fringe lateral electric field is applied to a region extending 1.5 µm toward the inside from the sides of the transparent electrode, and, hence, the light passes over this region.

FIG. 3 is a cross-sectional view taken along a line 3–3' in FIG. 1. This cross-sectional view shows a cross section of the TFT made of polysilicon and the holding capacitance in FIG. 1. The left side of the cross-sectional view in FIG. 3 shows the cross section of the TFT. The TFT constitutes a so-called MOS TFT having a gate insulation film GI in which the drain line DL and the metal pixel electrode SPM are respectively used as a so-called drain electrode and a source electrode, and the gate line GL is used as a gate electrode. The polysilicon layers PSI are formed over a background insulation film ULS. The drain line DL is connected to a highly concentrated n-type layer PSI (n+), which is doped with phosphorus of low-temperature polysilicon PSI as the impurity, through the first contact hole CNT1 formed in the gate insulation film GI and the interlayer insulation film ILI. The highly concentrated n-type layer PSI(n+) is highly conductive and functions as though it were a wiring portion. On the other hand, the low-temperature polysilicon PSI below the gate line GL is constituted of a p-type layer PSI(p) doped with boron as the impurity and functions as a so-called semiconductor layer. The p-type layer PSI(p) performs a switching operation in which the p-type layer PSI(p) becomes conductive with the gate line GL at an ON potential and becomes non-conductive at an OFF potential. When an ON voltage is applied to the gate line GL, below the gate insulation film GI which is arranged below the gate line GL, a potential formed at the interface of the p-type layer PSI(p) doped with boron with the gate insulation film GI is inverted so as to form a channel layer; and, the layer is converted into the n-type so that an ON current flows into the TFT, and, thus, an electric current flows into the metal pixel electrode SPM, whereby the liquid crystal capacitance and the holding capacitance are charged.

The holding capacitance Cstg is formed in such a manner that, as shown in FIG. 3, the high-concentration n-type polysilicon layer PSI (n+) is used as one electrode, a laminated film consisting of a gate insulation film GI and an interlayer insulation film ILI is used as an insulation film and the holding capacitance electrode STM is used as the other electrode. The holding capacitance electrode STM is made by the same steps and of the same material as the drain line DL. The pixel potential is supplied to the n-type polysilicon layer PSI (n+) from the drain line DL via the TFT, while the common potential is supplied to the holding capacitance electrode STM from the transparent common electrode line CLT via the fourth contact CNT4, which is formed by opening up the protective film PAS and the organic protective film FPAS. The above-mentioned n-type polysilicon layer PSI (n+) and the holding capacitance electrode STM are respectively separated from the gate line GL by means of the gate insulation film GI or the interlayer insulation film ILI. Accordingly, as shown in FIG. 1, it is possible to arrange the holding capacitance Cstg to be substantially parallel to the gate line GI by narrowing the distance therebetween; and, hence, the aperture ratio can be enhanced, whereby it is possible to provide a bright liquid crystal display device having a high transmissivity.

The holding capacitance Cstg is set to hold the potential during the image display period (holding period), which is determined by the liquid crystal capacitance with respect to a leakage current which is increased by pairs of electrons and positive holes generated by irradiation of light by the backlight for display from the TFT glass substrate GLS1 side to the polysilicon PSI of the TFT, as seen in FIG. 3. If this value can be made large, it is possible to hold the uniformity over the display screen in an extremely favorable state.

FIG. 4 is a cross-sectional view taken along a line 4—4' in FIG. 1. As seen in this cross-sectional view, there is a path along which the pixel potential from the first contact hole CNT1 in FIG. 1 passes the low-temperature polysilicon PSI, passes second and third contact holes CNT2, CNT3 formed at the center portion of the pixel and is supplied to the transparent pixel electrode SPT. The cross-section transverses the neighboring drain lines DL and the second and third contact holes CNT2, CNT3, which are arranged at the center portion between the neighboring drain lines DL.

The pixel potential which is supplied to the low-temperature polysilicon layer PS1 (n+) is transmitted to the pad electrode PAD via the second contact hole CNT2 that is opened up in the gate insulation film GI and in the interlayer insulation film ILI formed over the low-temperature polysilicon layer PSI (n+). The pad electrode PAD is made by the same steps and made of the same material as the drain line DL. Thus, the pixel potential is supplied to the transparent pixel electrode SPT via the third contact hole CNT3, which is opened up in the protective film PAS and an organic protective film FPAS, that are applied over the pad electrode PAD.

In this embodiment, the conventional metal common electrode line which is arranged parallel to the gate line GL is not provided. Accordingly, the transmitting region also extends over the contact region at the center of the pixel. This transmitting region, as seen in FIG. 4, is constituted of two transmitting regions which are sandwiched by the transparent pixel electrode SPT and the transparent common electrode lines CLT, which are arranged to cover the drain lines DL. In this manner, this embodiment can provide a large number of transmitting regions, and, hence, it can provide a bright liquid crystal display device.

Now, the steps employed in the manufacture of the NMOS type TFT shown in FIG. 3 will be explained with reference to FIG. 5 to FIG. 9 and FIG. 3.

After cleaning the alkalifree TFT glass substrate GLS1, having a thickness of 0.7 mm, a size of 730 mm×920 mm and a strain point of approximately 670 degree centigrade, the background insulation film ULS is formed by laminating a $Si_3N_4$ film and a $SiO_2$ film over the alkalifree TFT glass substrate GLS1, wherein the $Si_3N_4$ film having a film thickness of 50 nm is formed by a plasma CVD method using a mixed gas of $SiH_4$, $NH_3$ and $N_2$; and, thereafter, the $SiO_2$ film having a film thickness of 120 nm is formed by a plasma CVD method using a mixed gas of tetraethoxysilane and $O_2$. The insulation film ULS is provided for preventing the diffusion of Na from the TFT glass substrate GLS1 to the polycrystalline silicon film. The formation temperature of both of the $Si_3N_4$ and $SiO_2$ films is 400 degrees centigrade. Here, although polycrystalline silicon is typically used as the semiconductor layer, the semiconductor layer may be formed of macro-crystalline silicon, continuous grain boundary silicon or amorphous silicon.

Subsequently, a substantially intrinsic hydrated amorphous silicon film having a film thickness of 50 nm is formed by a plasma CVD method using a mixed gas of $SiH_4$ and Ar. The film forming temperature is 400 degree centigrade, and the hydrogen quantity immediately after film forming is approximately 5 at %. Subsequently, the substrate is annealed for approximately 30 minutes at a temperature of 450 degrees centigrade so as to dissipate hydrogen in the hydrated amorphous silicon film. The hydrogen quantity after annealing is approximately 1 at %.

Subsequently, an excimer laser having a wave length of 308 nm is used to irradiate the amorphous silicon film at a fluence of 400 mJ/cm$^2$ so as to melt and recrystallize the amorphous silicon film, thus obtaining the substantially intrinsic polycrystalline silicon film. Here, the laser beam has a thin elongated line shape with a width of 0.3 mm and a length of 200 mm. The laser beam is irradiated to the substrate by moving the substrate at a pitch of 10 μm in a direction substantially perpendicular to the longitudinal direction of the beam. The irradiation is performed in a nitrogen atmosphere.

Figure 5:
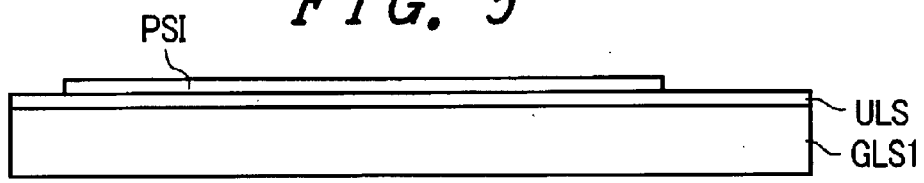
FIG. 5 is a cross-sectional view showing a method of manufacture of a TFT substrate of the TFT liquid crystal display device according to the one embodiment of the present invention up to the completion of the first photolithography step.

A given resist pattern is formed over the polysilicon film PSI by a usual photolithography method, and the polysilicon film PSI is formed into a given shape by a reactive ion etching method using a mixed gas of $CF_4$ and $O_2$ (FIG. 5).

Subsequently, a $SiO_2$ film having a film thickness of 100 nm is formed by a plasma CVD method using a mixed gas of tetraethoxysilane and oxygen, thus obtaining the gate insulation film GI. Here, the mixing ratio of tetraethoxysilane and $O_2$ is set to 1:50, and the film forming temperature is set to 400 degree centigrade. Subsequently, B ions are implanted at an acceleration voltage of 33 Kev and a dose quantity of 1E12 ($cm^{-2}$) by an ion implantation method so as to form the polysilicon film PSI(p) in the channel region of the n-type TFT.

Then, a metal line, that is, a Mo film or a MoW film, for example, having a film thickness of 200 nm, is formed by a sputtering method; and, thereafter, a given resist pattern is formed over the Mo film by a usual photolithography method. Thereafter, the Mo film is formed into a given shape by a wet etching method using a mixed acid, thus obtaining the scanning line GL.

Figure 6:
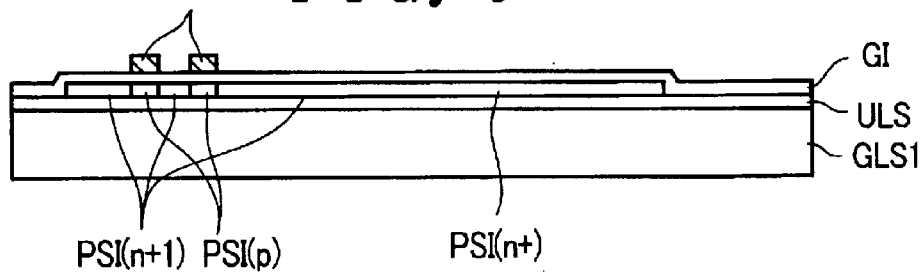
FIG. 6 is a cross-sectional view showing the method of manufacture of the TFT substrate of the TFT liquid crystal display device according to the one embodiment of the present invention up to the completion of the second photolithography step.

While leaving the resist pattern used for etching as it is, P ions are implanted at an acceleration voltage of 60 Kev and a dose quantity of 1E15 ($cm^{-2}$) by an ion implantation method so as to form the source and drain regions PSI(n+) of the n-type TFT (FIG. 6). Although the n-type TFT, in which the source and drains are respectively formed of the (n+)-type low-temperature polysilicon film PSI(n+) and the polysilicon film PSI(p) of the p-type channel region, is formed in accordance with the above-mentioned steps, it is possible to reduce current leakage of the TFT by forming an n-type LDD region whose P ion concentration is smaller than that of the (n+)-type region between the p-type region and the (n+)-type region (not shown in the drawing). That is, after removing the resist pattern that is used for etching. P ions are implanted again at an acceleration voltage of 65 Kev and a dose of 2E13 ($cm^{-2}$) by an ion implantation method, so as to form the LDD region of the n-type TFT. The length of the LDD region is determined based on a side etching quantity at the time of performing the wet etching of Mo. In this embodiment, the length of the LDD region is approximately 0.8 μm. The length can be controlled by changing the over-etching time of Mo.

Subsequently, the implanted impurities are activated by a rapid thermal annealing (RAT) method which irradiates light of an excimer lamp or a metal halide lamp to the substrate. By performing annealing using light which contains a large quantity of ultraviolet rays irradiated from the excimer lamp or the metal halide lamp or the like, it is possible to selectively heat only the polysilicon layer PSI so that any damage which may be caused by heating the glass substrate can be obviated. The activation of the impurities may be performed by heat treatment at more than 450 degrees centigrade, provided that shrinkage, bending deformation or the like of the substrate is small so as to not cause any problem (FIG. 6).

Subsequently, a $SiO_2$ film having a film thickness of 500 nm is formed by a plasma CVD method using a mixed gas of tetraethoxysilane and oxygen, thus obtaining an interlayer insulation film ILI. Here, the mixing ratio of tetraethoxysilane and oxygen is 1:5 and the film forming temperature is 350 degree centigrade.

Figure 7:
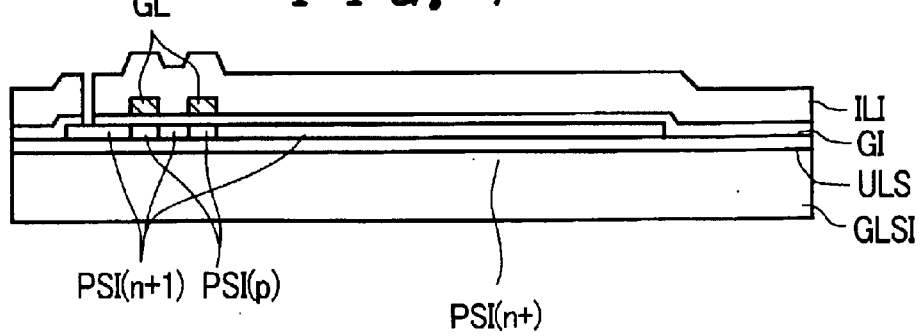
FIG. 7 is a cross-sectional view for showing the method of manufacture of the TFT substrate of the TFT liquid crystal display device according to the one embodiment of the present invention up to the completion of the third photolithography step.

Then, after forming a given resist pattern, the first contact through hole CNT1 and the second contact through hole CNT2 shown in a plan view of FIG. 1 are opened up in the above-mentioned interlayer film by a wet etching method using a mixed acid (FIG. 7).

Figure 8:
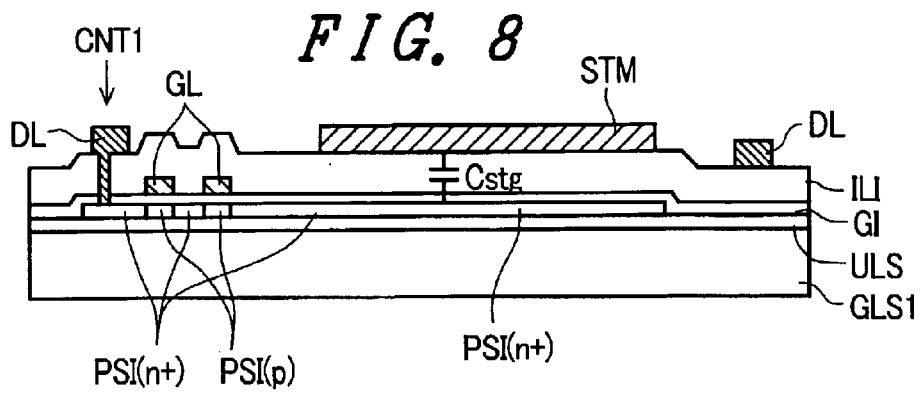
FIG. 8 is a cross-sectional view for showing the method of manufacture of the TFT substrate of the TFT liquid crystal display device according to the one embodiment of the present invention up to the completion of the fourth photolithography step.

Subsequently, by a sputtering method, a Ti film having a film thickness of 50 nm, an Al—Si alloy film having a film thickness of 500 nm and a Ti film having a film thickness of 50 nm are sequentially formed by lamination. Then, a given resist pattern is formed. Thereafter, by a reactive ion etching method using a mixed gas of $BCl_3$ and $Cl_2$, etching of all regions is performed, thus obtaining the drain lines DL, the holding capacitance electrode STM and the pad electrodes PAD in the plan view shown in FIG. 1 (FIG. 8).

Figure 9:
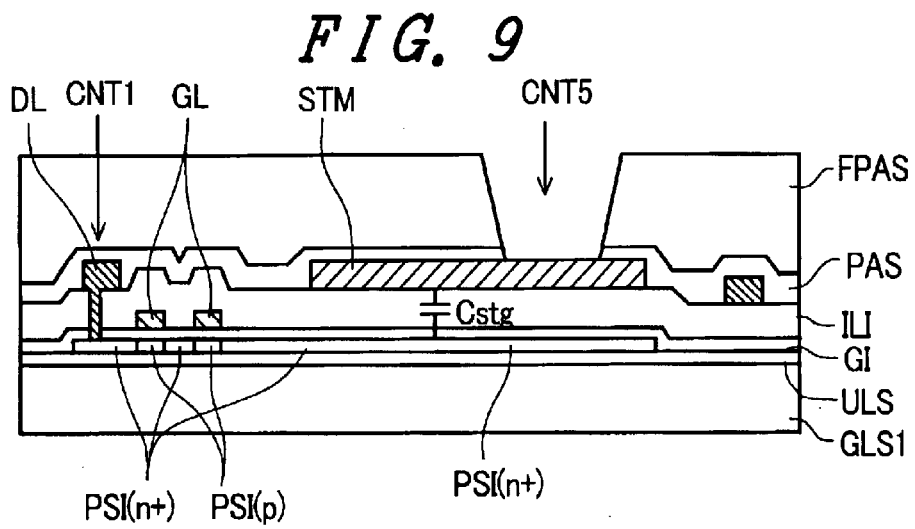
FIG. 9 is a cross-sectional view for showing the method of manufacture of the TFT substrate of the TFT liquid crystal display device according to the one embodiment of the present invention up to the completion of the fifth photolithography step.

The protective film PAS, which is a $Si_3N_4$ film having a film thickness of 300 nm, is formed by a plasma CVD method using a mixed gas of $SiH_4$, $NH_3$ and $N_2$. Further, an acrylic photosensitive resin film having a film thickness of approximately 3.5 μm is applied by a spin coating method, and exposure and development are performed using a given mask, thus forming through holes in the acrylic resin. Then, the acrylic resin is baked for 20 minutes at a temperature of 230 degrees centigrade thus obtaining the leveled organic protective film FPAS having a film thickness of 2.0 μm. Subsequently, using the through hole pattern formed in the organic protective film FPAS as a mask, the $Si_3N_4$ film arranged below the organic protective film FPAS is processed by a reactive ion etching method using $CF_4$, thus forming the fifth contact hole CNT5 and the third contact hole CNT3, as shown in the plan view of FIG. 1, in the $Si_3N_4$ film (FIG. 9).

By processing the insulation film which constitutes the layer below the organic protective film FPAS using the organic protective film FPAS as a mask, films in two layers can be patterned in one photolithography step so that the manufacturing process can be simplified.

Finally, the transparent conductive film, such as an ITO film having a film thickness of 70 nm, is formed by a sputtering method. Then, by wet etching using a mixed acid, the transparent conductive film is processed in a given shape, thus forming the transparent common electrode line CLT and the transparent pixel electrode SPT, whereby the active matrix substrate is completed (FIG. 3). As described above, the polycrystalline silicon TFT is formed by performing the photolithography steps 6 times or more.

Figure 10:
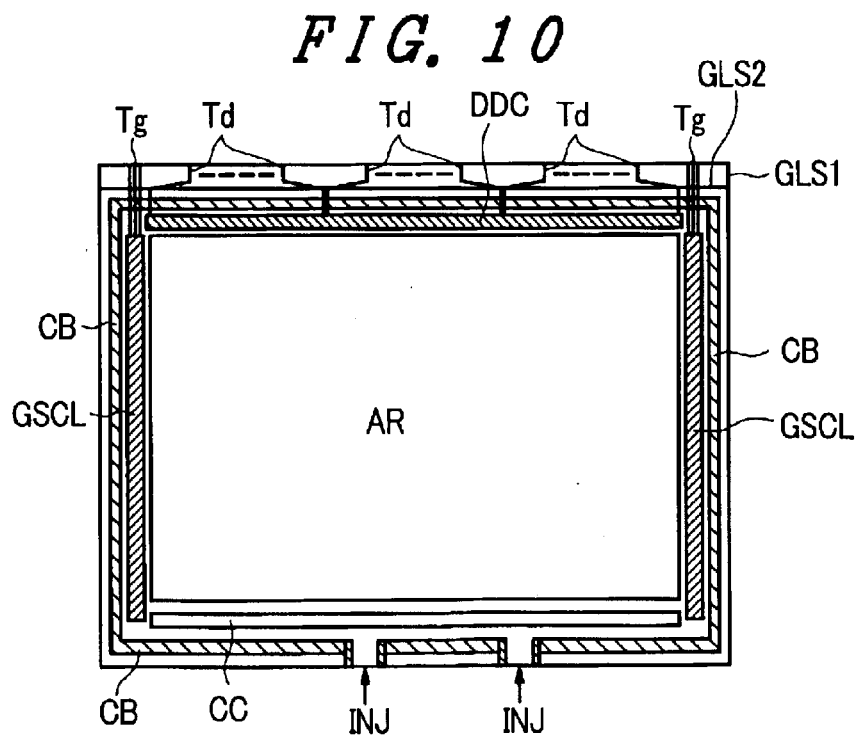
FIG. 10 is an overall plan view of an LCD cell which is formed by laminating a TFT glass substrate and a CF glass substrate to each other.

Now, the planar structure of the overall appearance of the liquid crystal panel will be explained. FIG. 10 is a view which shows an essential part around a matrix (AR) of a display panel including upper and lower glass substrates GLS1, GLS2. In manufacturing the panel, when the panel is of a small size, for purposes of enhancing the throughput, a plurality of devices are simultaneously processed on a sheet of glass serving as a substrate; and, thereafter, the glass substrate is divided. On the other hand, when the panel is of a large size, for enabling the common use of a manufacturing installation, a glass substrate which is standardized for any types of panels is processed and is reduced into a size which matches each type of panel, and the glass substrate is cut after making the glass substrate pass through a series of steps.

FIG. 10 shows the latter case in a state in which the upper and lower substrates GLS1, GLS2 are already cut. In both cases, in a completed state, the size of the upper substrate GLS2 is made smaller than the lower side substrate GLS1 such that a portion (upper side in the drawing) where groups of external connection terminals Tg, Td are present is exposed. With respect to the groups of terminals Tg, Td, the group of terminals Tg are the connection terminals for supply of power and timing data, which are supplied to a scanning circuit GSCL of the low-temperature polysilicon TFT that are arranged at left and right sides of the display region AR on the TFT glass substrate GLS1. The group of terminals Td are connection terminals for supplying video data or power source data to a video signal circuit DDC of the low-temperature polysilicon TFT formed over an upper portion of the display region AR of the TFT glass substrate GLS1. These groups of terminals are designated by arranging a plurality of lead line portions in each tape carrier package TCP (FIG. 11) on which integrated circuit chips CHI are mounted. The lead lines, which extend from matrix portions of respective groups to external connection terminal portions through the video signal circuit DDC, are inclined as these lead lines approach both ends. Such an arrangement is provided for matching the arrangement pitch of the package TCP and the connection terminal pitch at respective packages TCP with the arrangement pitch of the video signal terminals Td of the display panel.

A seal pattern SL for sealing the liquid crystal LC is formed between the transparent glass substrates GLS1, GLS2 along the peripheries of these substrates GLS1, GLS2, except for a liquid crystal filling port INJ. The sealing material is, for example, an epoxy resin.

The orientation films ORI, whose cross-sectional structure is shown in FIG. 2, are formed inside of the seal pattern SL. The liquid crystal LC is sealed in a region defined by the lower orientation film ORI and the upper orientation film ORI, which set the direction of liquid crystal molecules, and the seal pattern SL.

The liquid crystal display device is assembled such that various types of layers are laminated at the lower transparent TFT glass substrate GLS1 side and the upper transparent CF glass substrate GLS2 side separately; the seal pattern SL is formed at the substrate GLS2 side; the lower transparent glass substrate SUB1 and the upper transparent glass substrate GLS2 are superposed over each other; the liquid crystal LC is filled through the liquid crystal filling port INJ formed in the sealing material SL; the liquid crystal filling port INJ is plugged by epoxy resin or the like; and the upper and lower substrates GLS1, GLS2 are cut.

Figure 11:
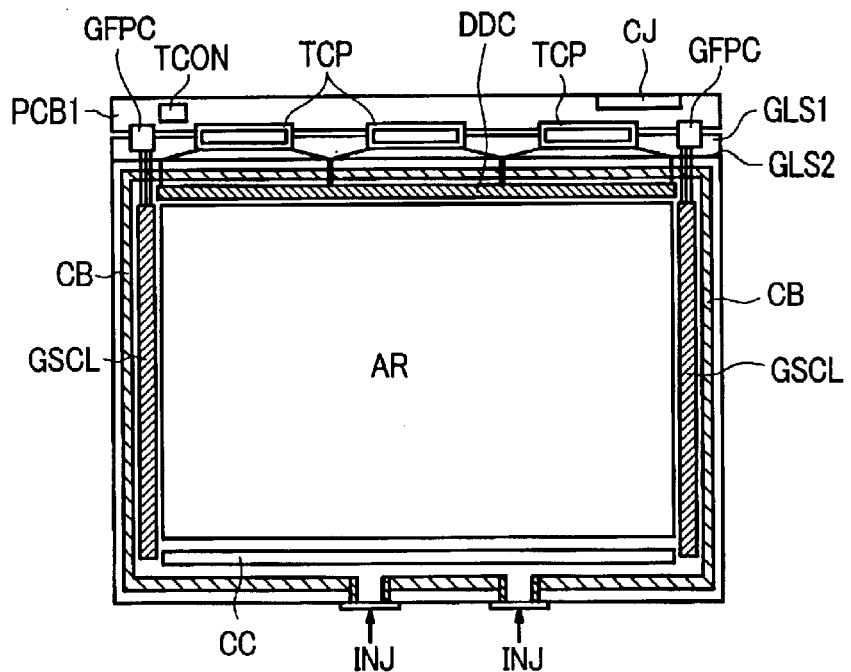
FIG. 11 is an overall plan view showing a state in which a PCB board and a TAB are connected to the LCD cell.

FIG. 11 is a plan view showing a state in which the tape carrier packages TCP, which mount the video signal driving ICs on the display panel shown in FIG. 10, and the signal circuit DDC, which is formed over the TFT substrate GLS1 using the low-temperature polysilicon TFT, are connected to each other, and a state in which the scanning circuit GSCL, which is formed over the TFT substrate GLS1 using the low-temperature polysilicon TFT, and the outside are connected to each other.

TCP indicates the tape carrier package on which driving IC chips are mounted by a tape automated bonding method (TAB), and PCB1 indicates a driving circuit board on which the above-mentioned TCP, a TCON which is a control IC, a power supply amplifier, resisters, capacitors and the like are mounted. CJ indicates a connector portion for introducing signals and supplying power from a personal computer or the like.

Figure 12:
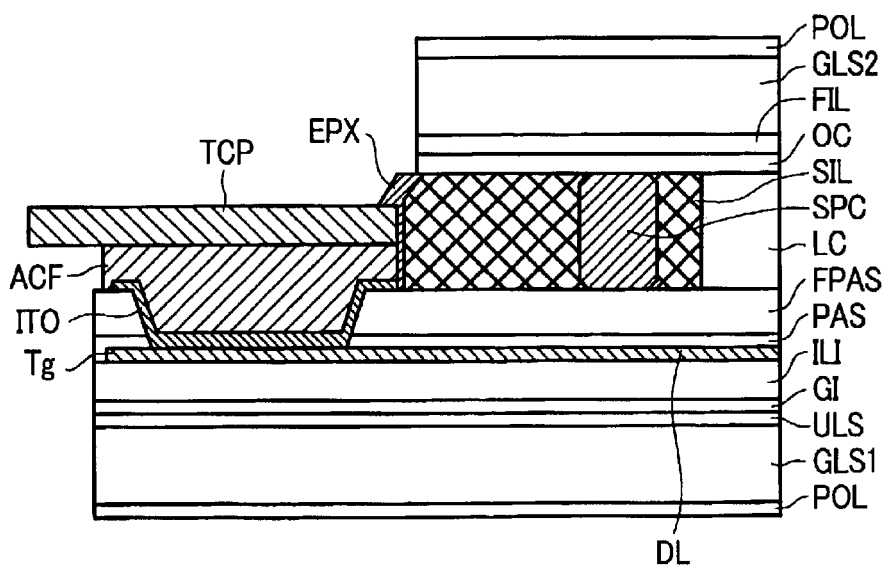
FIG. 12 is a cross-sectional view of the TAB of the LCD cell and the neighborhood of a drain-side pull-out terminal portion.

FIG. 12 is a cross-sectional view of an essential part showing a state in which the tape carrier package TCP is connected to the signal circuit terminal Td of the liquid crystal display panel. The tape carrier package TCP is connected to the liquid crystal display panel through an anisotropic conductive film ACF. Although the package TCP may preferably have a distal end portion thereof that is electrically connected to the connection terminal Td at the panel side, the fact is that the package TCP is connected to the transparent electrode ITO, which is formed so as to cover an apertured portion formed in the protective film PAS and the organic protective film FPAS of the TFT and also is formed by the same step as the transparent common electrode line CLT. The gap defined between the upper and lower glass substrates GLS1, GLS2 outside the seal pattern SL is protected by epoxy resin EPX or the like after cleaning. Silicone resin is further filled between the package TCP and the upper CF substrate GLS2 so as to ensure multiple protection (not shown in the drawing). Further, the gap defined for filling the liquid crystal LC between the upper and lower glass substrates GLS2, GLS1 has a height thereof determined by support columns SPC formed of an organic film or fibers.

Figure 13:
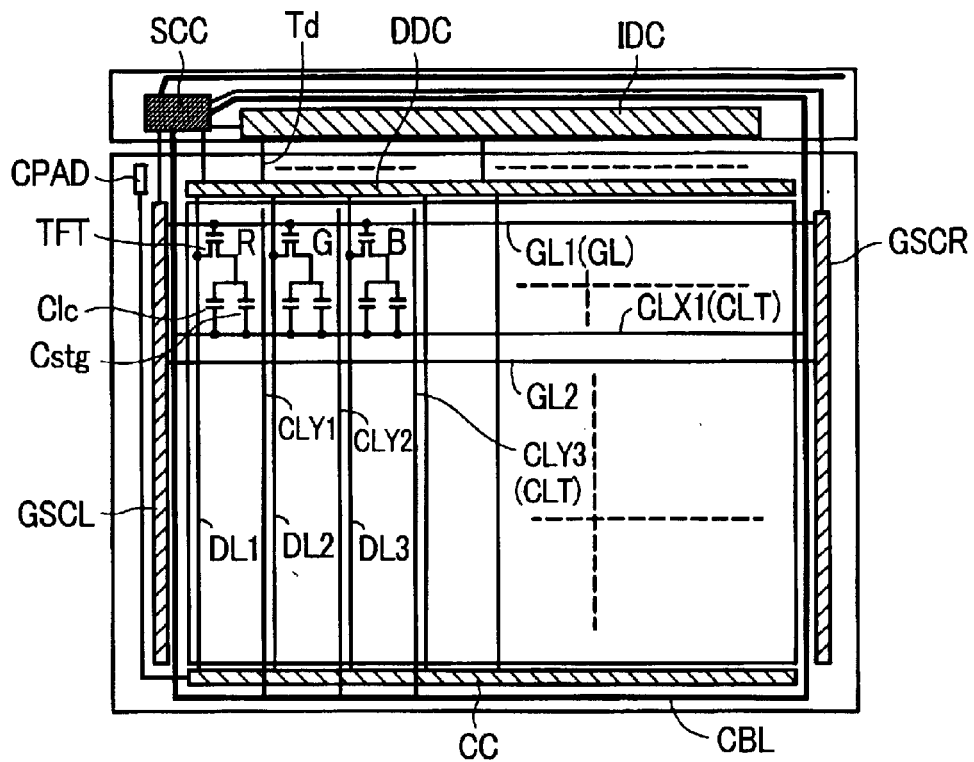
FIG. 13 is a plan view including a schematic equivalent circuit of the TFT liquid crystal display device.

A wiring chart between an equivalent circuit of a display matrix portion and a peripheral circuit around the equivalent circuit is shown in FIG. 13. In the drawing. DL indicates drain lines, wherein numerals in the symbols DL1, DL2 and DL3 indicate the order of the arrangement of the drain lines (video signal lines) within the screen from the left side of the screen. Suffixes R, G and B are respectively provided corresponding to red, green and blue pixels. GL indicates gate lines, wherein numerals in the symbols GL1, GL2 and GL3 indicate the order of the arrangement of the gate lines within the screen from the upper side of the screen. Suffixes 1, 2 are added in accordance with the order of scanning timing. CLX and CLY indicate common electrode lines CLT, wherein numerals in the symbols CLX1, CLX2 indicate the order of arrangement of the lateral common electrode lines within the screen from the upper side of the screen. On the other hand, CLY indicates common electrode lines in the longitudinal direction and numerals in the symbols CLY1, CLY2 indicate the order of arrangement of the longitudinal common electrode lines within the screen from the left side of the screen. In an actual liquid crystal display device, the common electrode lines CLX, CLY are arranged in a mesh pattern such that the common electrode lines CLX, CLY cover the drain line DL and the gate line GL in one pixel region.

The gate lines GL (suffixes being omitted) are connected to the scanning circuit GSCL on the glass substrate, and electricity and timing signals are supplied to the scanning circuit from a power supply and a timing circuit SCC which are formed over a printed circuit board PCB arranged outside the glass substrate. In the above-mentioned constitution, to the scanning circuit formed over the glass substrate, which is constituted of the low temperature polysilicon TFT, electricity is supplied from both left and right sides with respect to one gate line (scanning line) to enhance the redundancy. However, electricity may be supplied to the scanning circuit from one side as required by the size of the screen or the like.

On the other hand, the supply of electricity is performed from the signal circuit DDC, which is formed over the glass substrate and comprises the low-temperature polysilicon TFT. The signal circuit DDC has a function of distributing the video data from the circuit constituted of the video signal circuit IC on the glass substrate in response to color data R, G, B. Accordingly, the number of connection terminals from the signal circuit on the glass substrate is one third of the number of the drain lines within the screen.

Further, the common electrode lines are constituted of transparent common electrode lines CLT in this embodiment. As shown in FIG. 1, the common electrode lines CLT are connected in a mesh pattern within the pixel. The common electrode lines CLX, CLY are pulled out to the left and right sides, or to the upper and lower sides of the screen, and are collectively connected to a common electrode bus line CBL having a low impedance; and, thereafter, they are connected to the power supply and the timing circuit SCC. The common electrodes give the common potential to the pixels in the screen.

The low-temperature polysilicon TFTs within the screen are n-type TFT5. The display is performed by applying a gate voltage to the gate lines GL and by supplying a drain voltage (data) which is supplied to the drain lines DL at the time of supplying the gate voltage to the gate lines GL to the liquid crystal capacitance Clc between the drain line DL and the common electrode lines CLT. To enhance the ability to maintain the potential of the liquid crystal capacitance Clc during the display period, the holding capacitance Cstg is formed. CC indicates an inspection circuit formed of a low-temperature polysilicon TFT which checks for the disconnection of the drain lines DL. CPAD indicates an inspection terminal.

Figure 14:
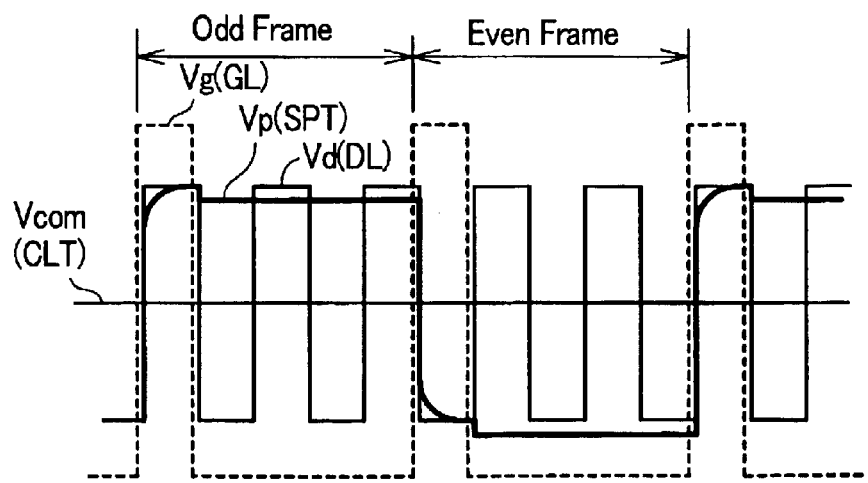
FIG. 14 is a timing chart of driving waveforms of the pixel of the TFT liquid crystal display device.

FIG. 14 shows driving wave forms of the liquid crystal display device of the present invention. FIG. 14 shows an example when the common electrode voltage Vcom is a direct current voltage. The gate voltage Vg sequentially scans every gate line. When a voltage obtained by adding a threshold voltage of the low-temperature polysilicon TFT of the pixel to the drain potential Vd is applied, the pixel TFT assumes an ON state and the gate voltage Vg is charged into the liquid crystal capacitance Clc shown in FIG. 13. The above-mentioned common electrode voltage Vcom, the gate voltage Vg, the drain voltage Vd are respectively applied to the common electrode line CLT, which constitutes the mesh-patterned common electrode line, the gate line GL and the drain line DL shown in FIG. 13. In this embodiment, the drain voltage Vd indicates a voltage which is used when a display of white is performed on a liquid crystal display with a normal black mode, for example, wherein the gate line is selected every line and the polarity is inverted to the plus side or the minus side with respect to the common electrode voltage Vcom every line. Although the pixel potential Vp is charged to the liquid crystal capacitance Clc through the TFT, the pixel potential Vp at odd and at even frames is inverted with respect to the common electrode potential Vcom. With respect to the gate line GL of the TFT at a specific address, when the gate line GL is selected and the gate voltage Vg becomes larger than the drain voltage Vd, the potential corresponding to the images is charged into the liquid crystal capacitance Clc. However, as mentioned above, in the subsequent frame, the potential of liquid crystal capacitance Clc must be held until the drain voltage Vd that is inverted with respect to the common electrode potential Vcom is applied. This holding rate is lowered when an OFF (leakage) current of the TFT is increased. To prevent the lowering of the holding rate, it is necessary to set the holding capacitance Cstg of the equivalent circuit shown in FIG. 13 to a large value.

Figure 15:
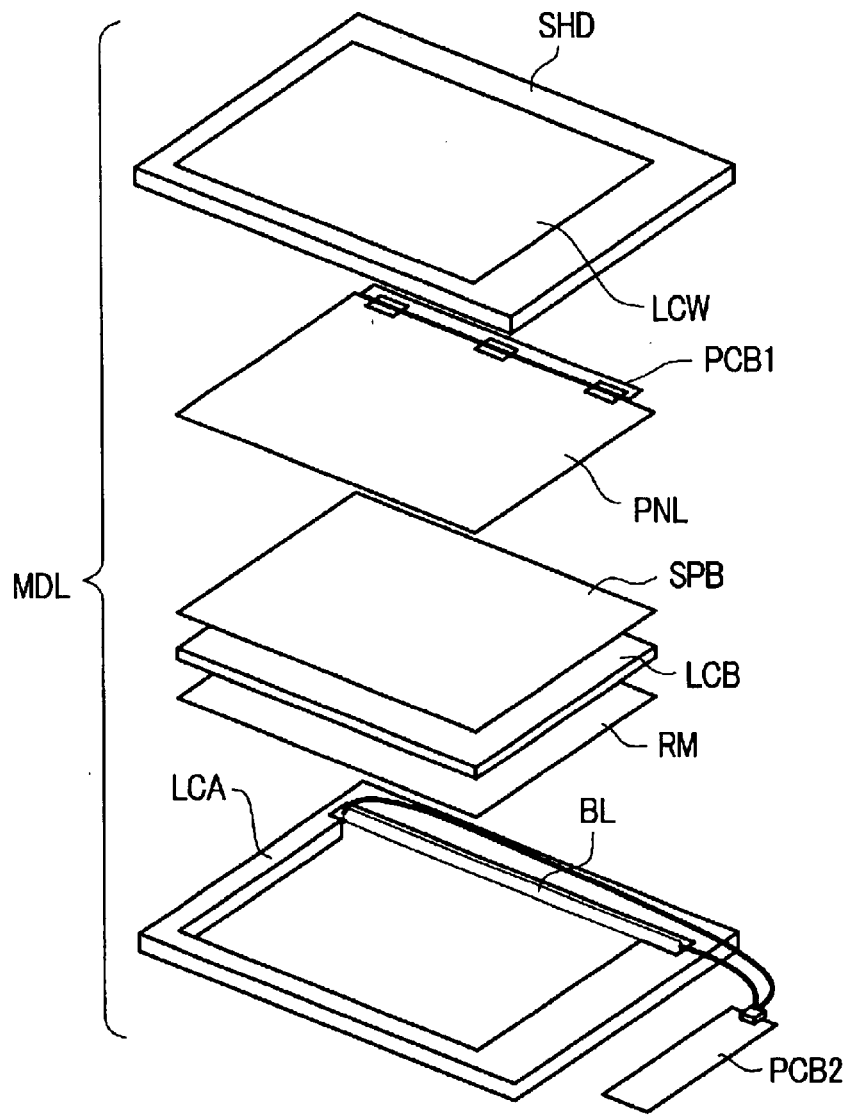
FIG. 15 is an exploded perspective view showing one example of the module of the present invention.

FIG. 15 is an exploded perspective view showing respective constitutional parts of a liquid crystal display module MDL. SHD indicates a frame-like shield case (metal frame) made of a metal plate, LCW indicates a display window of the shield case SHD, PNL indicates a liquid crystal display, SPB indicates a light diffusion plate, LCB indicates a light guide body, RM indicates a reflection plate, BL indicates a backlight fluorescent tube and LCA indicates a backlight case. The module MDL is assembled by laminating respective members in accordance with the vertical arrangement relationship shown in the drawing.

The module MDL has the whole structure thereof fixed by pawls and hooks mounted on the shield case SHD. The backlight case LCA is configured such that a backlight fluorescent lamp BL, the light diffusion plate SPB, the light guide body LCB and the reflection plate RM can be accommodated therein. Light emitted from the backlight fluorescent tube BL, which is arranged along a side surface of the light guide body LCB, is formed into a uniform backlight on a display screen through the light guide body LCB, the reflection plate RM and the light diffusion plate SPB, and the backlight is irradiated to the liquid crystal display panel PNL side. The backlight fluorescent tube BL is connected to an inverter printed circuit board PCB2 which constitutes a power supply of the backlight fluorescent tube BL.

Embodiment 2

Figure 17:
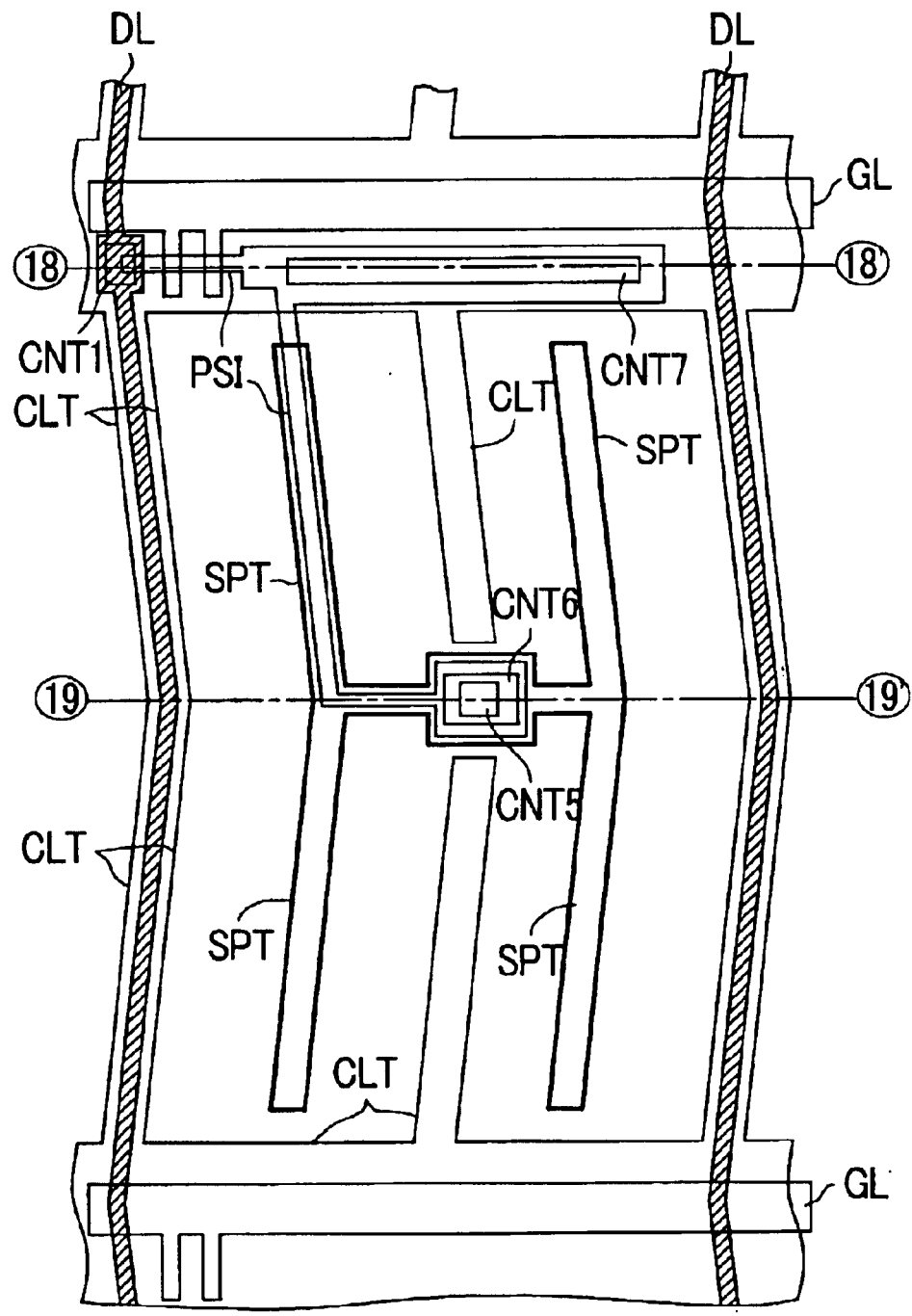
FIG. 17 is a plan view of a pixel of a TFT liquid crystal display device according to another embodiment of the present invention.
Figure 18:
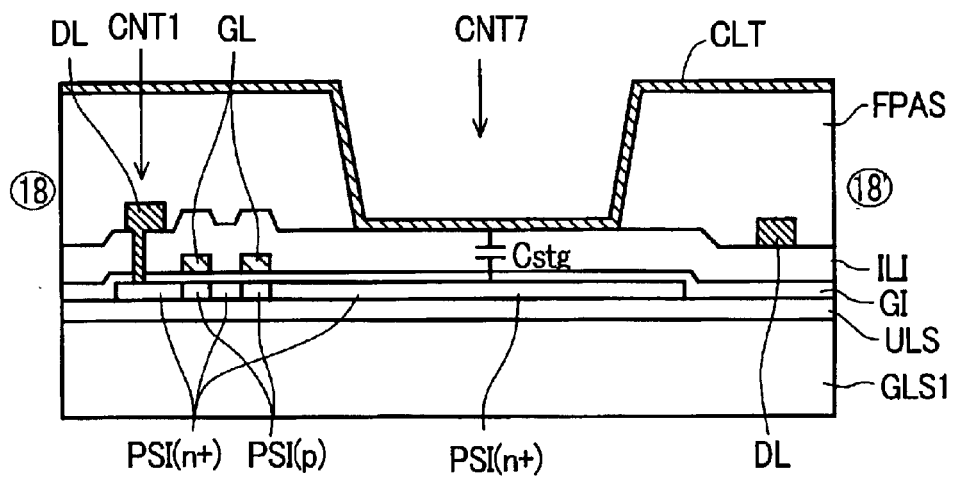
FIG. 18 is a cross-sectional view taken along a line 18–18' in FIG. 17, which traverses neighboring drain lines.
Figure 19:
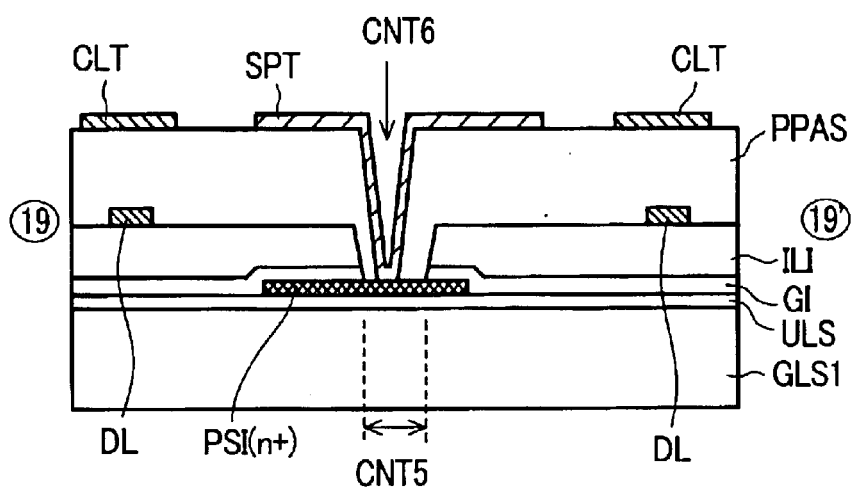
FIG. 19 is a cross-sectional view taken along a line 19–19' in FIG. 17 which traverses neighboring drain lines.

FIG. 17 is a plan view showing the pixel of the second embodiment of the present invention, and FIG. 18 and FIG. 19 are cross-sectional views taken along cut lines indicated by chain lines as 18–18' and 19–19' in FIG. 17. In these drawings, to facilitate an understanding of the cut portions in the drawings, numerals surrounded by circles are used to indicate the cut portions.

FIG. 17 shows an IPS mode pixel pattern, which has four main transmitting portions in the direction which transverses the drain lines DL, in the same manner as the embodiment 1. The essential feature in the constitution which makes this embodiment 2 different from the embodiment 1 lies in the constitution of the holding capacitance, which is arranged in the vicinity of the gate line GL. Further, another feature in the constitution which makes this embodiment 2 different from the embodiment 1 lies in the constitution of the contact hole at a connecting portion between the low-temperature polysilicon PSi and the transparent pixel electrode SPT.

The holding capacitance Cstg has the following constitution. First of all, the lower electrode of the holding capacitance is constituted of an n-type polysilicon PSI layer. This constitution is the same as the constitution of the embodiment 1. On the other hand, the upper electrode of the holding capacitance is constituted of a transparent common electrode line CLT, which is embedded in a seventh contact hole CNT7. In this constitution, in contrast to the embodiment 1, the holding capacitance electrode which is formed by the same steps and made of the same material as the drain lines DL is not formed. Accordingly, in this constitution, there exists no metal electrode which is formed on the same layer as the drain lines DL, and, hence, there are no electrodes which cause short circuiting. Accordingly, display defects, such as point defects, can be largely reduced.

On the other hand, the pixel potential from the drain line DL is transmitted to the low-temperature polysilicon PSI via the first contact hole CNT1. Then, the pixel potential reaches the transparent pixel electrode SPT via fifth and sixth contact holes CNT5, CNT6 that are formed in the center portion of the pixel. Here, the sixth contact hole CNT6 is made larger than the fifth contact hole CNT5, and the transparent pixel electrode SPT is arranged such that the width of the transparent pixel electrode SPT is larger than the width of the sixth contact hole CNT6.

FIG. 18 is a cross-sectional view taken along a cut line 18–18' in FIG. 17. The left side of the drawing provides a cross-sectional view of the TFT, wherein, when the ON voltage is applied to the gate line of the TFT in response to the video voltage from the drain line DL, the p-type polysilicon layer PSI(p) reduces the resistance thereof and the potential is added to the liquid crystal capacitance and the holding capacitance Cstg as the pixel potential. The lower electrode of the holding capacitance Cstg is constituted of the n+ type polysilicon PSI(n+), while the upper electrode of the holding capacitance Cstg is constituted of the transparent common electrode line CLT, which covers and is embedded in an opening in the organic protective film FPAS. The insulation film of the holding capacitance Cstg is formed of a laminated film consisting of the gate insulation film GI and the interlayer insulation film ILI in the same manner as the embodiment 1. In this embodiment, as the material of the electrodes of the holding capacitance, the electrode materials of the gate lines GL and the drain lines DL are not used. Accordingly, the possibility that a defect occurs due to short circuiting between these electrodes and the drain line DL can be totally eliminated.

FIG. 19 shows a cross-section of a connecting portion between the low-temperature polysilicon PSI and the transparent pixel electrode SPT. The low-temperature polysilicon layer PSI, which supplies the pixel potential, is directly connected to the transparent pixel electrode SPT via the sixth contact hole CNT6, which is formed in the inside of the fifth contact hole CNT5. As opposed to the embodiment 1, the connecting portion has no metal pad electrode; and, hence, there arises no defect attributed to short circuiting between the drain lines DL and these electrodes.

In the above-mentioned manner, according to this embodiment, as shown in the plan view of FIG. 17 and the cross-sectional views of FIG. 18 and FIG. 19, metal electrodes are not used, except for the gate lines GL and the drain lines DL. This implies that when the pixel shown in FIG. 16 is observed from the front, the reflection is extremely small; and, hence, a liquid crystal display device an be in which the reflection of the face of an observer who looks at the liquid crystal display device can be reduced, which is a new feature that can provide a liquid crystal display device having an enhanced image quality.

Embodiment 3

Figure 20:
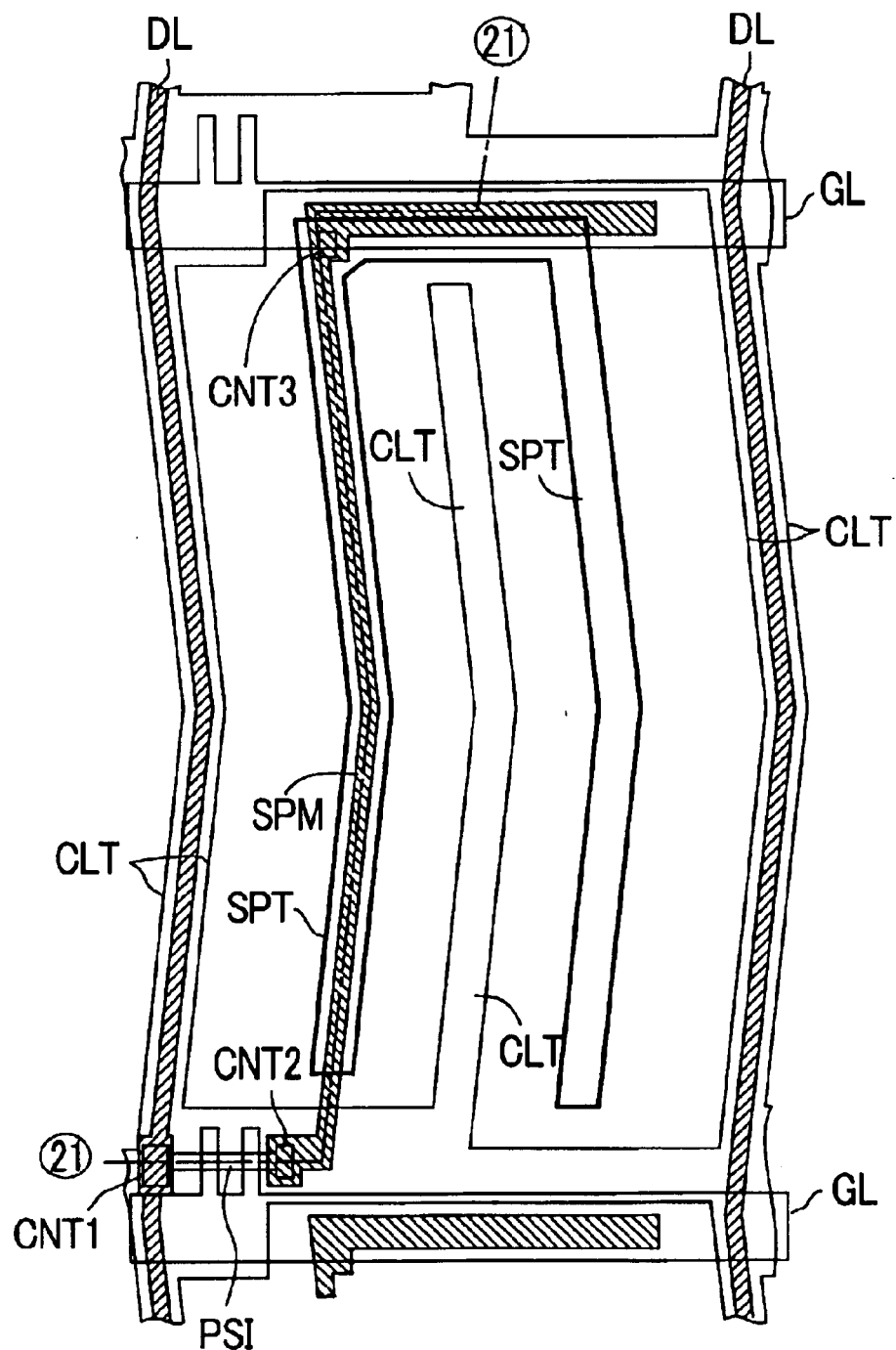
FIG. 20 is a plan view of a pixel of a TFT liquid crystal display device according to still another embodiment of the present invention.
Figure 21:
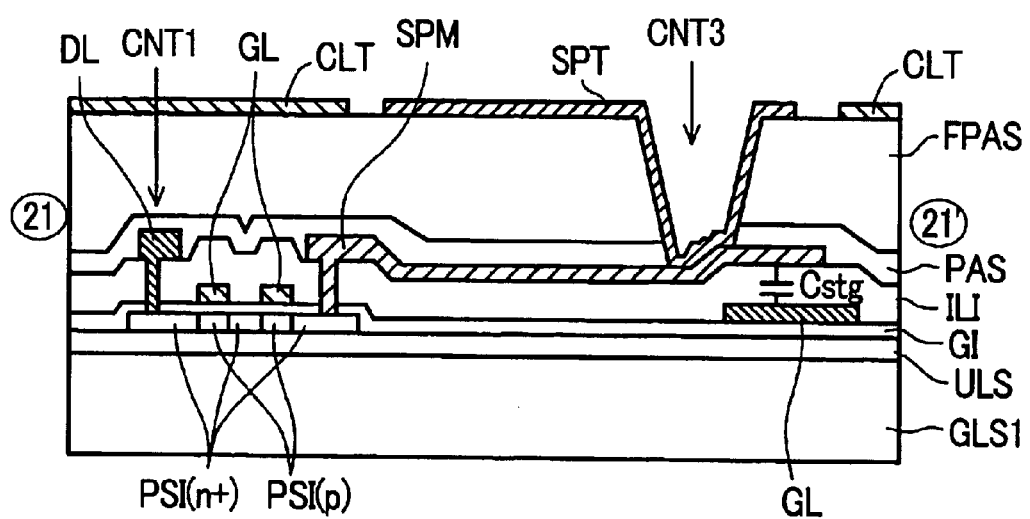
FIG. 21 is a cross-sectional view taken along a line 21–21' in FIG. 20.

FIG. 20 is a plan view showing a pixel according to the third embodiment of the present invention. FIG. 21 is a cross-sectional view taken along a cut line indicated by a chain line 21–21' in FIG. 20. In these drawings, to facilitate the understanding of the cut portion in the drawing, numerals surrounded by circles so are used indicate the cut portion.

FIG. 20 shows an IPS mode pixel pattern which has four main transmitting portions in the direction which transverses the drain lines DL in the same manner as the embodiment 2. FIG. 20 shows the paths through which a pixel potential and a common potential are supplied with electricity. The pixel potential is supplied to the metal pixel electrode SPM from the drain line DL via the first contact hole CNT1, the low-temperature polysilicon PSI and the second contact hole CN2, to oppose the gate line GL on which the TFT is formed. The pixel potential transmitted to the metal pixel electrode SPM is bifurcated in the vicinity of the third contact hole CNT3. In one path, the pixel potential is transmitted to the transparent pixel electrode SPT in a planar arrangement having a shape bent from the third contact hole CNT3 within the area of one pixel. In the other path, the metal pixel electrode SPM extends over the gate line GL of a preceding row and forms a holding capacitance with the gate line GL of the preceding row.

The largest feature of this embodiment is that the pixel electrode or the source electrode that crosses the common electrode line, which has been adopted in the conventional IPS liquid crystal display device, is completely eliminated from the inside of the pixel, thus realizing an extremely high aperture ratio.

FIG. 21 is a cross-sectional view of a portion in which the drain line DL is connected to the TFT of low-temperature polysilicon PSI via the first contact hole CNT1; the TFT of the low-temperature polysilicon PSI is connected to the metal pixel electrode SPM; and the metal pixel electrode SPM extends over the gate line GL of the preceding row, so as to form the holding capacitance Cstg.

The metal pixel electrode SPM, which is connected to the low-temperature polysilicon PSI via the second contact hole CNT2, extends over the gate line GL of preceding row which is covered with the interlayer insulation film III, thus forming the holding capacitance. In contrast to the conventional IPS display device, this metal pixel electrode SPM is not provided on the common electrode line which is made by the same process and made of the same material as the gate line GL; and, hence, the metal pixel electrode SPM has fewer sections so that the possibility that disconnection occurs is lessened. It is needless to say that the aperture ratio is also enhanced so that it is possible to provide a bright liquid crystal display device. Accordingly, the holding capacitance can be formed by using the gate line GL of a preceding row as one electrode, the interlayer insulation film as the insulation film and the metal pixel electrode SPM as the other electrode. The pixel potential is supplied to the transparent pixel electrode SPT that is arranged over the organic protective film via the third contact hole CNT3 and drives the liquid crystal together with the common potential of the transparent common electrode line CLT.

The holding capacitance Cstg of this embodiment can be classified as an example of the so-called Cadd method.

Further, in this embodiment, the transparent pixel electrode SPT and the transparent common line CLT are configured such that these electrodes are arranged in a convex-concave relationship over the gate line GL, so that a wide region of the gate line GL is substantially covered with the transparent electrode constituting an uppermost layer, thus shielding leakage of electric field from the gate line GL. Due to such a constitution, it is possible to realize a shielding of the electric field, while preventing a short-circuiting between the transparent common line CLT and the transparent pixel electrode SPT.

Further, the metal pixel electrode SPM also may be arranged such that the metal pixel electrode SPM covers at least a portion of the gate line GL at the gap which is formed between the transparent common electrode CLT and the transparent pixel electrode SPT. This structure is shown in FIG. 20. Due to such a constitution, it is possible to increase the holding capacitance and, at the same time, to shield the electric field leaking from the gap between the transparent common line CLT and the transparent pixel electrode SPT using the metal pixel electrode SPM, whereby it is possible to realize an increase of the holding capacitance and a reduction of the leaking electric field at the same time.

It is needless to say that the metal pixel electrode SPM can completely cover the gap between the transparent common line CLT and the transparent pixel electrode SPT along the extending direction of such a gap. It is because of this provision that it is possible to further enhance the leaking electric field prevention effect.

As described above, according to this embodiment the holding capacitance is formed over the gate line GL of a preceding row; and, hence, it is possible to provide a bright IPS type liquid crystal display device which can also provide a higher aperture ratio.

As has been described heretofore in detail, with the liquid crystal display device adopting the IPS display method, which is mainly constituted of the low-temperature polysilicon TFTs of the present invention, it is possible to provide a bright liquid crystal display device of high quality having a high yield factor.

What is claimed is:

1. An active matrix type liquid crystal display comprising:
    a liquid crystal layer and a color filter layer which are sandwiched by a first substrate and a second substrate;
    a plurality of gate lines, a plurality of drain lines which cross the gate lines in a matrix array and thin film transistors which are formed corresponding to respective intersections of the gate lines and the drain lines on the first substrate, and forming a pixel in each region surrounded by the neighboring gate lines and the neighboring drain lines;
    the first substrate includes semiconductor layers of the thin film transistors, a first insulation film formed on the semiconductor layers, a second insulation film formed on the first insulation film, and common lines formed on the second insulation film;
    wherein the second insulation film is removed at regions where the semiconductor layers are formed and holding capacitance is formed by a common potential supplied from the common lines in the removed regions and a pixel potential formed by the semiconductor layers.

2. An active matrix type liquid crystal display device according to claim 1, wherein the common line is shared in common by neighboring pixels in the up and down direction and by neighboring pixels in the left and right direction in the matrix array.

3. An active matrix type liquid crystal display device according to claim 2, wherein the active matrix type liquid crystal display device is of a lateral electric field type and includes pixel electrodes which generate a lateral electric field between the pixel electrodes and the common line on the first substrate.

4. An active matrix type liquid crystal display device according to claim 3, wherein the second insulation film is an organic film.

5. An active matrix type liquid crystal display device according to claim 4, wherein the common line and the pixel electrodes are formed over the organic film in the same layer.

6. An active matrix type liquid crystal display device according to claim 5, wherein the common line is a transparent common line.

7. An active matrix type liquid crystal display device according to claim 4, wherein the liquid crystal display device includes a metal electrode which is formed over the first insulation film such that the metal electrode is positioned in a region where the second insulation film is removed and where the semiconductor layer is formed, and the common potential is supplied to the metal electrode from the common line.

8. An active matrix type liquid crystal display device according to claim 7, wherein the metal electrode is made by the same process and made of the same material as the drain line.

9. An active matrix type liquid crystal display device according to claim 4, wherein the common line covers the gate line and a holding capacitor providing the holding capacitance by way of an insulation film.

10. An active matrix type liquid crystal display device according to claim 4, wherein the common line is a transparent common line.

11. An active matrix type liquid crystal display device according to claim 1, wherein an insulation film which is sandwiched by electrodes which constitute the holding capacitance is a laminated film consisting of a gate insulation film of the thin film transistor and an interlayer insulation film which separates the gate line and the drain line.

12. An active matrix type liquid crystal display device according to claim 1, wherein semiconductor layers of the thin film transistors are constituted of polysilicon.

13. An active matrix type liquid crystal display device comprising:
    a liquid crystal layer and a color filter layer which are sandwiched by a first substrate and a second substrate;
    a plurality of gate lines, a plurality of drain lines which cross the plurality of gate lines in a matrix array and thin film transistors which are formed corresponding to respective intersections of the gate lines and the drain lines on the first substrate;
    pixel region surrounded by neighboring gate lines and neighboring drain lines,
    wherein the liquid crystal display device includes common electrodes and pixel electrodes which are formed on the first substrate in the same layer, and the common electrodes and the pixel electrodes are arranged to have a space therebetween in an extension direction of the gate lines in plan view, and a metal electrode to which a pixel electrode potential is supplied is formed in at least a portion of the space.

14. An active matrix type liquid crystal display device according to claim 13, wherein the active matrix type liquid crystal display device is of a lateral electric field.

15. An active matrix type liquid crystal display device according to claim 13, wherein the metal electrode is extended such that the metal electrode covers the space as well as a common electrode and a pixel electrode.

16. An active matrix type liquid crystal display device comprising:
    a liquid crystal layer and a color filter layer which are sandwiched by a first substrate and a second substrate;
    a plurality of gate lines, a plurality of drain lines which cross the plurality of gate lines in a matrix array and thin film transistors which are formed corresponding to respective intersections of the gate lines and the drain lines on the first substrate;
    pixel region surrounded by neighboring gate lines and neighboring drain lines, wherein each pixel includes a common electrode and a pixel electrode both formed on the first substrate;
    wherein the source electrode of each thin film transistor is extended to the neighboring gate line which is different from the date line over which the thin film transistor is formed, and holding capacitance is formed between one electrode which is constituted of the gate line of a preceding row and another electrode which is constituted of the source electrode; and
    wherein the pixel electrode and the common electrode are transparent and are formed as layers above the source lines by way of an insulation film.

* * * * *